United States Patent [19]

Nishikawa et al.

[11] Patent Number: 5,255,753
[45] Date of Patent: Oct. 26, 1993

[54] FOOT STRUCTURE FOR LEGGED WALKING ROBOT

[75] Inventors: Masao Nishikawa; Tomoharu Kumagai; Shoei Abe; Masato Hirose; Mitsuaki Hirakawa; Hiroshi Gomi, all of Wako, Japan

[73] Assignee: Honda Giken Kogyo Kabushiki Kaisha, Tokyo, Japan

[21] Appl. No.: 887,240

[22] Filed: May 19, 1992

Related U.S. Application Data

[63] Continuation of Ser. No. 627,728, Dec. 14, 1990, abandoned.

[30] Foreign Application Priority Data

Dec. 14, 1989 [JP] Japan ................. 1-324217

[51] Int. Cl.⁵ .................................... B62D 57/032
[52] U.S. Cl. .................................... 180/8.6; 36/28; 36/30 R; 36/59 A; 36/139; 180/8.1; 200/86.5; 414/5; 623/53; 623/54; 623/55; 901/1
[58] Field of Search ................. 180/8.1, 82.8.3, 8.6; 901/1; 414/1, 5; 364/513; 250/229, 221.1; 36/30 R, 28, 38, 59 R, 59 A, 27, 43, 44, 139, 4; 361/224; 200/86.5; 623/53, 54, 55, 47

[56] References Cited

U.S. PATENT DOCUMENTS

| 577,133 | 2/1897 | Haberl | 623/54 |
|---|---|---|---|
| 594,121 | 11/1897 | Read | 623/54 |
| 1,272,098 | 7/1918 | Reily | 36/59 R |
| 3,668,337 | 6/1972 | Sinclair | 200/865 |
| 3,680,231 | 8/1972 | Dymond | 36/59 R |
| 3,702,999 | 11/1972 | Gradisar | 36/139 |
| 4,377,041 | 3/1983 | Alchermes | 36/30 R |
| 4,521,685 | 6/1985 | Rebman | 414/5 |
| 4,641,251 | 2/1987 | Inoue | 901/1 |
| 4,707,570 | 11/1987 | Ide et al. | 200/86 R |
| 4,905,383 | 3/1990 | Beckett et al. | 36/28 |
| 5,007,938 | 4/1991 | Prahl | 623/55 |

FOREIGN PATENT DOCUMENTS

| 39377 | 2/1987 | Japan | 180/8.6 |
|---|---|---|---|
| 62-97005 | 6/1987 | Japan . | |
| 62-97006 | 6/1987 | Japan . | |
| 47686 | 2/1989 | Japan | 180/8.6 |
| 48283 | 2/1990 | Japan | 180/8.1 |
| 670800 | 7/1989 | Switzerland | 36/59 R |
| 1344350 | 10/1987 | U.S.S.R. | 623/53 |

OTHER PUBLICATIONS

JRSJ vol. 1, No. 3, Oct. 1983 "A Control Study of Dynamical Locomotion Robot—A Low Order Model And A High Hierarchial Control Strategy".

*Primary Examiner*—Mitchell J. Hill
*Attorney, Agent, or Firm*—Lyon & Lyon

[57] ABSTRACT

A legged walking robot such as a two-legged walking robot has a plurality of movable legs and a plurality of foot soles mounted respectively on distal ends of the movable legs by respective foot joints. Each of the foot soles has a curved surface disposed on at least a portion of a peripheral edge thereof. The curved surface is shaped such that the foot joint follows a predetermined curved path along a forward direction in which the legged walking robot walks. The foot sole also includes at least one projection on one or each of leading and trailing ends of the foot sole in the forward direction. The projection is movable into and out of a projecting position from the foot sole, but is normally urged into the projecting position to support the foot sole stably on the terrain.

17 Claims, 13 Drawing Sheets

FOOT STRUCTURE FOR LEGGED WALKING ROBOT

This application is a continuation of Ser. No. 07/627,728, filed Dec. 14, 1990, and now abandoned.

BACKGROUND OF THE INVENTION

1. Field of the Invention

The present invention relates to a foot structure for a legged walking robot, and more particularly to a foot structure for a two-legged walking robot, which foot structure achieves a smooth and quick gait for walking of the robot, as with the gait of a human being.

2. Prior Art

There are known legged moving machines which are movable in a wide space range. One of the known legged moving machines is a two-legged walking machine or robot which can move freely in a small working environment, as disclosed in Japanese Laid-Open Patent Publications Nos. 62(1987)-97005 and 62(1987)-97006.

The conventional two-legged walking robots have rather sluggish gaits for walking, and are unable to move smoothly and quickly like human beings. Therefore, the known two-legged walking robots consume an undue amount of energy for walking and are subject to undesirable limitations on the range of jobs which are to be done by the robots.

The terrain under a two-legged walking robot may not necessarily be a flat horizontal terrain, but may be a rough terrain. It is desirable that the two-legged walking robot have foot soles well constructed to fit with the irregular surfaces of the terrain. If the foot soles were not shaped to fit with the rough terrain, then the foot soles would not be able to apply necessary drive forces to the terrain, resulting in a lack of sufficient reactive forces from the terrain. Thus, it would be impossible to control the posture and direction of the robot with accuracy, and the robot might stumble on the terrain.

When a foot of a two-legged walking robot lands on the terrain, it undergoes shocks or impacts due to reactive forces from the terrain. It is necessary to dampen such shocks or impacts in order to transmit required forces to the terrain for maintaining the desired robot posture or in order to vertically control the center of gravity of the robot in coordination with the periodic walking movements of the feet.

Some robot foot soles have curved front ends (corresponding to the tips of the toes) and curved rear ends (corresponding to the heels). The curved front and rear ends of the foot soles, however, make the robot unstable when the robot is held at rest and standing. When the foot soles land on or are lifted off the terrain, they are in linear contact with the terrain. If the terrain is not horizontal, then the foot soles contact the terrain unstably. Even if the terrain is horizontal, the foot soles contact with the terrain over a distance corresponding to the width of the foot soles. Consequently, when an undesirable moment is applied to turn the legs about the vertical axis, the foot soles are unable to produce a sufficient resistive force against the moment. As a result, the robot may turn from the forward direction into an unexpected direction.

The stability of a two-legged walking robot while it is being held at rest will also be of importance in the future when smaller and lighter actuators will be available. More specifically, while a two-legged walking robot is standing at rest, it is not desirable from the standpoint of saving energy to supply the actuators with an energy such as an electric current to keep the actuators locked in servo control at all times, however a discontinuation of the supply of the energy to the actuators impairs the static stability of the robot.

The stability of robots while in walking motion will be considered below. The stability of four-legged walking robots is much better than the stability of two-legged walking robots because the feet of the four-legged walking robots have a sufficient wide area for contact with the terrain and the ratio of the area of the feet to the height of the center of gravity is large. The two-legged walking robots are however poor in stability since the center of gravity is high, the area of the feet for contact with the terrain is small, and periods of time in which the robot is supported by only one leg while walking are inevitable. Sensors for achieving stable operation of the robot may include a visual sensor, a balance sensor (inclinometer), joint angle sensors, and sensors for detecting reactive forces applied from the terrain to the foot soles.

The sensors associated with the foot soles should preferably be capable of detecting the shape of an object which is stepped upon and the irregularity of the terrain, because the two-legged walking robot is required to move or walk in the same space range as human beings and there are many objects such as stairs, sills, electric wires in the floor, and surface irregularities in the space range.

The foot structure of a legged walking robot needs to fit well with small surface irregularities of the terrain on which the robot moves. The foot structure which fits well with small surface irregularities allows drive forces and reactive forces to be transmitted well between the feet and the terrain, so that the robot can be controlled in posture and direction. Sensors which are combined with the foot soles have to be covered for protection against damage. However, if the sensors are covered with a protective layer, then the sensitivity thereof is lowered, and the sensors do not operate reliably. If the sensitivity of the sensors is to be maintained at a desired level, then the protective layer over the sensors should be thinned down at the expense of better protection.

SUMMARY OF THE INVENTION

It is an object of the present invention to provide a foot structure for a legged walking robot, which can achieve a smooth and quick gait before and after its feet land on and are lifted off the terrain while the robot is walking straight and turning, the foot structure being an energy saver, simple in construction, small in size, and light in weight.

Another object of the present invention is to provide a foot structure for a legged walking robot, which has foot soles designed to fit well with the terrain on which the robot moves.

Still another object of the present invention is to provide a foot structure for a legged walking robot, which is of a simple, small, and light construction capable of effectively dampening shocks or impacts produced at the time the feet land on and are lifted off the terrain.

Yet another object of the present invention is to provide a foot structure for a legged walking robot, which has foot soles that have an increased area for contact with the terrain for stability when the robot is standing and that fit well with the terrain for an increased area for contact with the terrain when the feet land on and are lifted off the terrain, the foot structure being also capable of effectively dampening shocks or impacts imposed while the robot is walking.

Yet still another object of the present invention is to provide a foot structure for a legged walking robot, which includes foot soles having movable members at the tips of the toes thereof, the movable members being fixed without the supply of energy when the robot is held at rest, so that the robot is stable and saves energy while being held at rest.

A further object of the present invention is to provide a foot structure for a legged walking robot, which has a contact sensor on a foot sole for detecting at least binary information to obtain at least two-dimensional contact information.

A still further object of the present invention is to provide a foot structure for a legged walking robot, which includes a contact sensor that is flexible itself to minimize the thickness of a protective layer covering the contact sensor.

To accomplish the above objects, there is provided a foot structure in a legged walking robot having a plurality of movable legs and a plurality of foot soles mounted respectively on distal ends of the movable legs by respective foot joints, the foot structure comprising a curved surface disposed on at least a portion of a peripheral edge of each of the foot soles, the curved surface being shaped such that the foot joint follows a predetermined curved path along a forward direction in which the legged walking robot walks. The legged walking robot with the foot structure can walk with a smooth and quick gait and also with a high energy consumption efficiency, like the gait of a human being.

The curved surface is disposed on a leading end of the foot sole in the forward direction. Therefore, the legged walking robot can walk smoothly and quickly with a high energy consumption efficiency as the leg is shifted from the support phase into the transfer phase.

The curved surface approaches the foot joint toward an outer side of the foot sole in a transverse direction normal to the forward direction. Thus, when the robot makes a turn, it can also walk smoothly and quickly with a high energy consumption efficiency.

The curved surface is disposed on a trailing end of the foot sole in the forward direction. Therefore, the legged walking robot can walk smoothly and quickly with a high energy consumption efficiency as the leg is shifted from the transfer phase into the support phase before and after the leg lands on and is lifted off the terrain.

The curved surface is continuous in a transverse direction normal to the forward direction, and comprises a convex surface extending entirely over the trailing end. With this arrangement, the legged walking robot can stably walk even when the foot sole lands at different positions on the terrain.

The foot structure also includes an elastic layer attached to the curved surface. The elastic layer is effective to absorb shocks or impacts when the leg lands on the terrain, resulting in a smoother gait.

The elastic layer has at least first characteristics in which it is elastically deformable substantially linearly in response to a load applied thereto, and second characteristics in which it is elastically deformable substantially nonlinearly in response to a load applied thereto. The elastic layer with such first and second characteristics can effectively dampen shocks when the leg lands on the terrain, and allows the foot sole to fit well with the terrain for a stable gait.

The foot structure further includes at least one projection on one or each of leading and trailing ends of the foot sole in the forward direction, the projection being movable into and out of a projecting position from the foot sole. This arrangement effectively compensates for a reduction in the static stability of the robot when the robot is held at rest, allows the robot to walk smoothly and quickly with a high energy consumption efficiency, and permits the robot to keep a stable posture when the robot is at rest.

The projection comprises an elastic member retractable out of the projecting position when it is elastically deformed in response to the increase in the load. The elastic projection can absorb shocks when the foot sole lands on the terrain for a stabler gait.

The foot structure further includes spring means for normally urging the projection into the projecting position, the projection being retractable out of the projecting position while compressing the spring means in response to the increase in the load. This also permits the robot to walk stably.

The foot structure includes a plurality of the projections positioned on the foot sole out of alignment with each other in the forward direction or a transverse direction normal to the forward direction. Since the pressure applied to the foot sole as it lands on the terrain is transmitted through successively varying points, i.e., distributed evenly, the force is transmitted smoothly from the terrain to the foot sole for a stabler gait.

The foot structure further includes actuator means for producing power, and power transmitting means for transmitting power from the actuator means to the projection, the actuator means being energizable to move the projection into and out of the projecting position through the power transmitting means. The robot is thus given a smooth and quick gait with a high energy saving efficiency. The robot can also be held in a stable posture when it is at rest.

There is also provided a foot structure in a legged walking robot having a plurality of movable legs and a plurality of foot soles mounted respectively on distal ends of the movable legs by respective foot joints, the foot structure comprising a plurality of detectors for detecting at least binary information depending on a load applied to the foot sole, and a decision circuit for determining an outer profile of an object brought into contact with the foot sole based on output signals from the detectors. The walking process of the robot can be controlled through recognition of the outer profile of an object that is brought into contact with the foot sole, so that the robot can walk stably even on a rough terrain with surface irregularities.

Each of the detectors includes an electrically conductive elastic member for producing an output signal depending on the magnitude of a load applied thereto. Therefore, the thickness of a protective layer covering the detectors is minimized. The detectors thus have a high detecting sensitivity, can dampen shocks or impacts applied thereto, and fit well with surface irregularities for a stabler gait.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
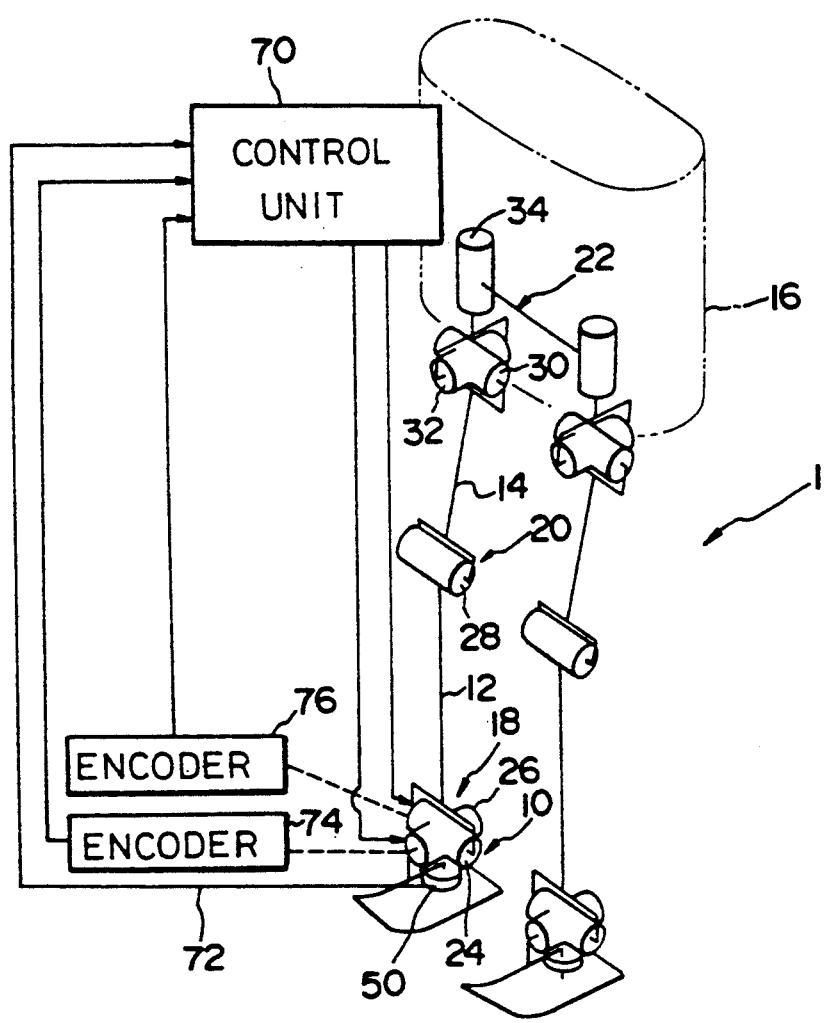
FIG. 1 is a schematic perspective view, partly in block form, of a legged walking robot including feet.

Like or corresponding parts are denoted by like or corresponding reference numerals throughout views.

FIG. 1 shows a two-legged walking robot incorporating a foot structure according to the present invention. The two-legged walking robot, generally denoted at 1, has two feet 10, two legs each composed of a shank 12 and a thigh 14, and a body 16. Each foot 10, the shank 12 and the thigh 14 of each leg, and the body 16 are operatively coupled by a foot joint 18, a knee joint 20, and a hip joint 22. The foot, knee, and hip joints 18, 20, 22 are associated with electric motors 24, 26, an electric motor 28, and electric motors 30, 32, 34, respectively.

The legs and the feet 10 are structurally identical to each other and positioned symmetrically. Therefore, the foot structure of only one of the feet will be described below.

Figure 2:
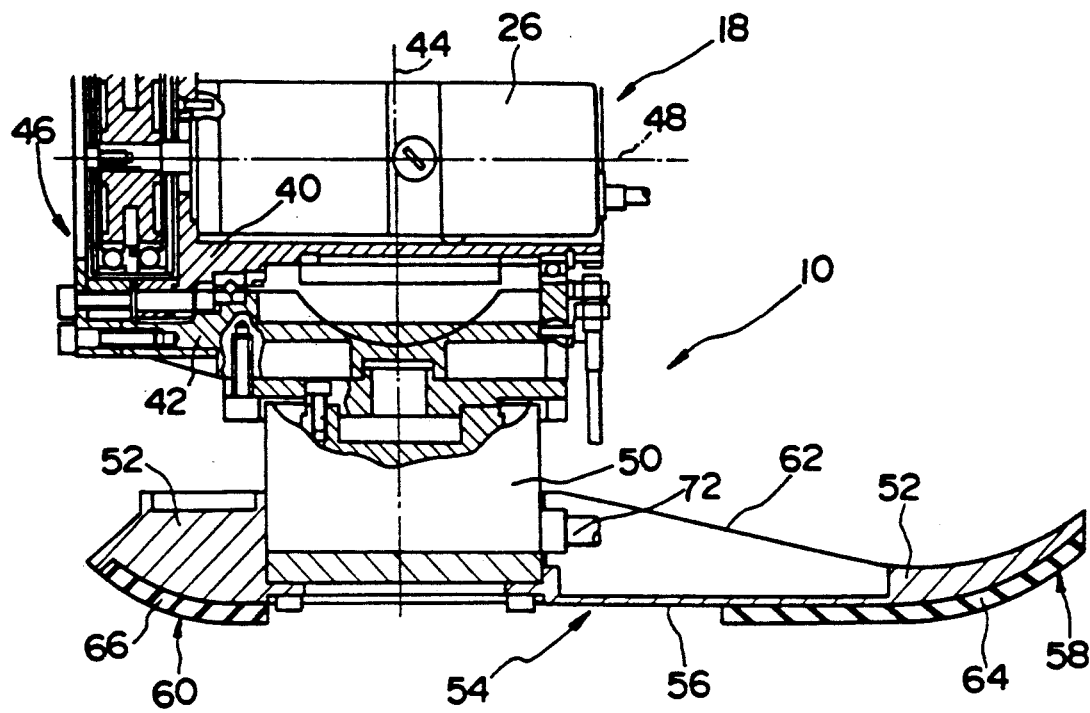
FIG. 2 is a vertical cross-sectional view of a foot structure for a legged walking robot according to a first embodiment of the present invention.
Figure 3:
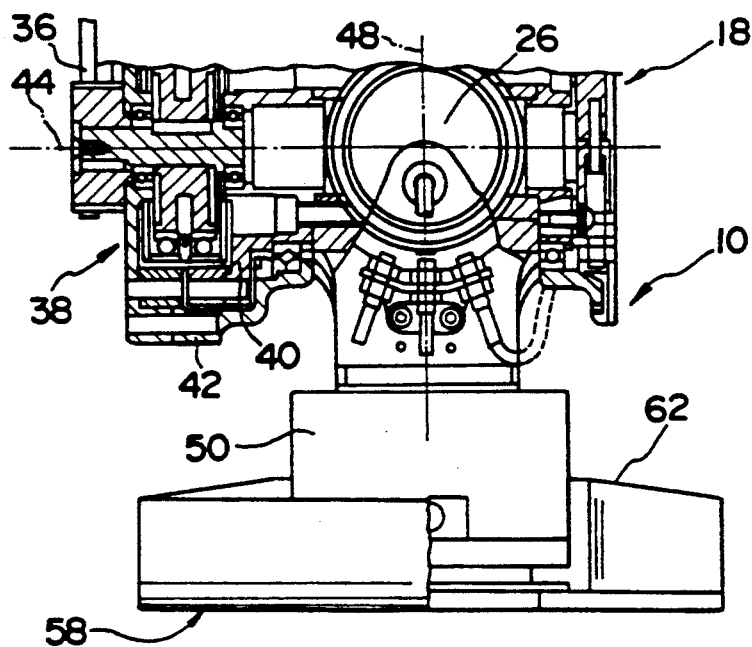
FIG. 3 is a front elevational view, partly broken away, of the foot structure shown in FIG. 2.

FIG. 2 shows the foot 10 in a cross section taken along a plane parallel to the forward direction in which the robot walks straight. FIG. 3 shows the foot 20 in a front elevation partly broken away. As shown in FIG. 3, the foot joint 18 is actuated by a first electric motor 24 (which is shown at an ankle in FIG. 1, but is actually mounted in a suitable position on the shank 12), rotation from which is transmitted through a belt 36 to a first Harmonic (commercial name) speed reducer 38 that reduces the speed of rotation while increasing the torque thereof. The foot joint 18 includes a fixed member 40 mounted on the shank 12 and a rotatable member 42 disposed below the fixed member 40. The first Harmonic speed reducer 38, when actuated, causes the rotatable member 42 to rotate about an axis 44 with respect to the fixed member 40, in a plane parallel to the forward direction of the robot. As shown in FIG. 2, the foot joint 18 also includes a second electric motor 26 whose axis extends perpendicular to the axis 44. Rotation from the second electric motor 26 is transmitted to a second Harmonic speed reducer 46 which causes the rotatable member 42 to rotate about a second axis 48 with respect to the fixed member 40 in a transverse plane normal to the forward direction of the robot.

Figure 5:
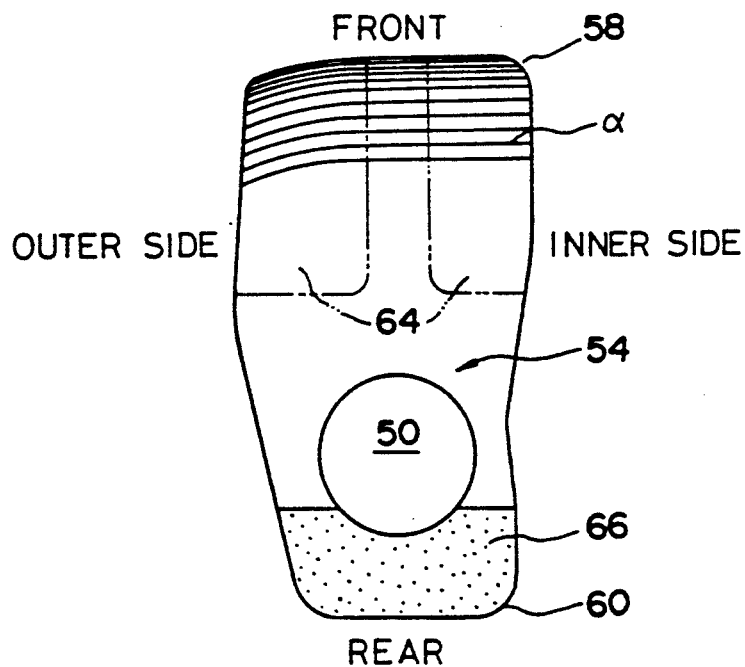
FIG. 5 is a bottom view of a foot sole shown in FIGS. 2 and 3.

The foot 10 has a known six-axis force sensor 50 disposed below the rotatable member 42, for measuring three-directional components Fx, Fy, Fz of a force and three-directional components Mx, My, Mz of a moment separately, thereby to determine whether the foot lands on the terrain or not, or the load with which the foot is placed on the terrain. The foot 10 has a boat-shaped frame 52 positioned below the sensor 50, the frame 52 being made of a light and rigid material such as aluminum or the like. The frame 52 has a lower surface serving as a foot sole 54 which comprises a substantially flat central area 56, a toe tip 58 located at a front end thereof in the forward walking direction, and a heel 60 located at a rear end thereof. The frame 52 also has an upper surface serving as a foot instep 62 which is substantially flat at its front end and has lateral sides progressively rising toward the sensor 50. Elastic layers 64, 66 as of rubber which have a suitable thickness are attached as by adhesive bonding respectively to the tip 58 and the heel 60, for absorbing or dampening shocks or impacts at the time the foot 10 lands on the terrain and also for allowing the foot sole 54 to fit with surface irregularities of the terrain. More specifically, the elastic layers 64, 66 cover positions corresponding to three supporting regions of a human foot sole. As shown in FIG. 5, no elastic layer is applied to the central area of the foot sole 54 in order to permit water to be discharged from the foot sole 54 when the robot walks on a wet floor or the like. The elastic layer 64 is composed of two divided layer members as indicated by the imaginary lines.

Figure 26:
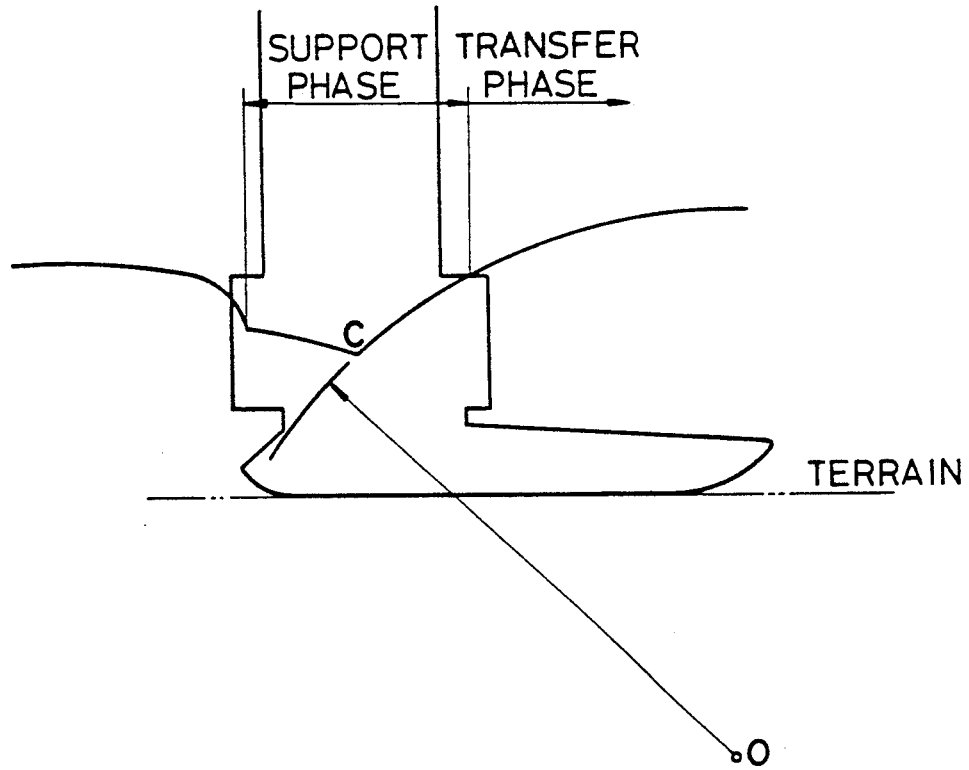
FIG. 26 is a diagram showing an ideal spatial path to be followed by a foot joint when the legged walking robot walks.
Figure 27:
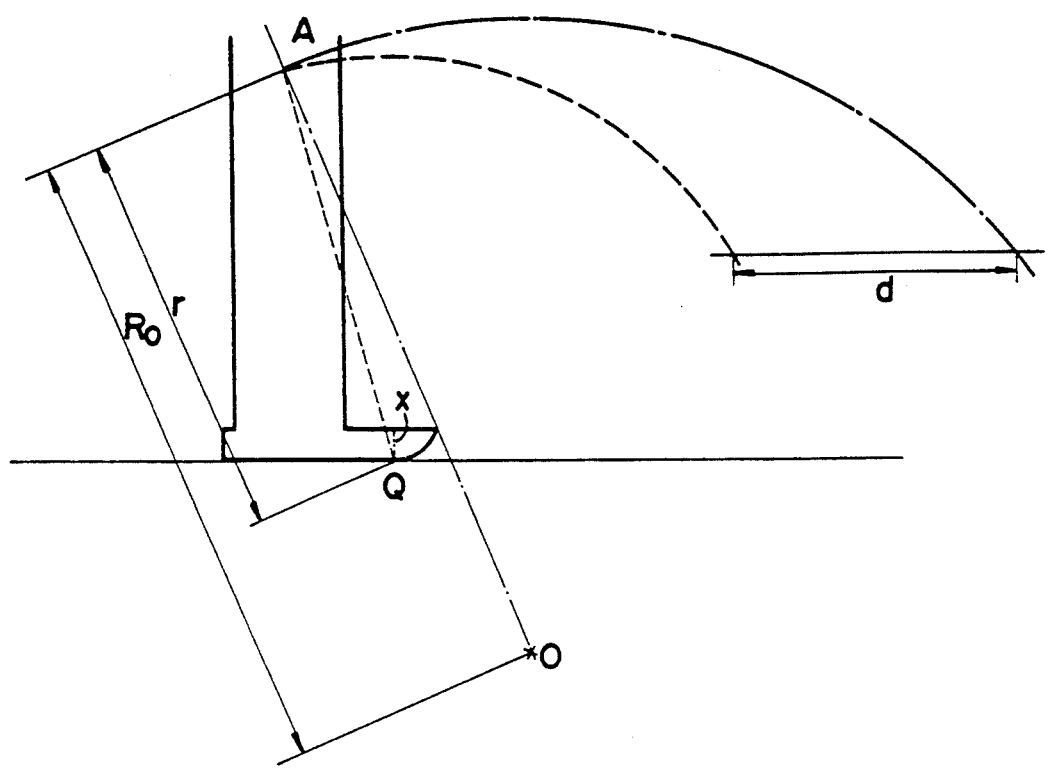
FIG. 27 is a diagram illustrative of a theoretical basis for the ideal path shown in FIG. 26.

The tip 58 of the foot sole 54 is curved upwardly as shown in FIGS. 2 and 3 with such a curvature that the foot joint follows a predetermined arcuate path parallel to the forward direction as shown in FIGS. 26 and 27 when the robot walks.

More specifically, as shown in FIG. 26, the foot joint (indicated by C) moves along a large arc parallel to the forward direction when the foot is in a support phase. Since the foot joint C follows the large arc in the support phase, the foot joint C moves along a smooth path as the foot is shifted from the support phase into a next transfer phase. Thus, the foot joint C is caused to rotate about a center 0 below the surface of the terrain, so that the virtual length of the leg is increased. If the movement of the foot joint is ignored, then the length of the shank is increased up to the length of a line segment AO interconnecting the center O and a point A as shown in FIG. 27. The apparent length of the leg is therefore increased, permitting the leg to have an increased stride and also permitting the robot to walk at an increased speed.

In FIG. 27, if the tip of the foot sole were not curved but extended vertically as indicated by the imaginary line, then the point A would follow a dashed arcuate path about a point Q, the dashed arcuate path having a radius r. With the curved tip of the foot sole, however, the point A follows a dot-and-dash arcuate path about the point 0, the dot-and-dash arcuate path having a radius Ro. Since the point A moves a distance which is a distance d greater than would be if the point A were turned about the point Q, the speed at which the robot walks is increased. The term "predetermined curve" employed in the specification and claims means a curve whose radius Ro of curvature is greater than the radius r of curvature (Ro>r).

Figure 4:
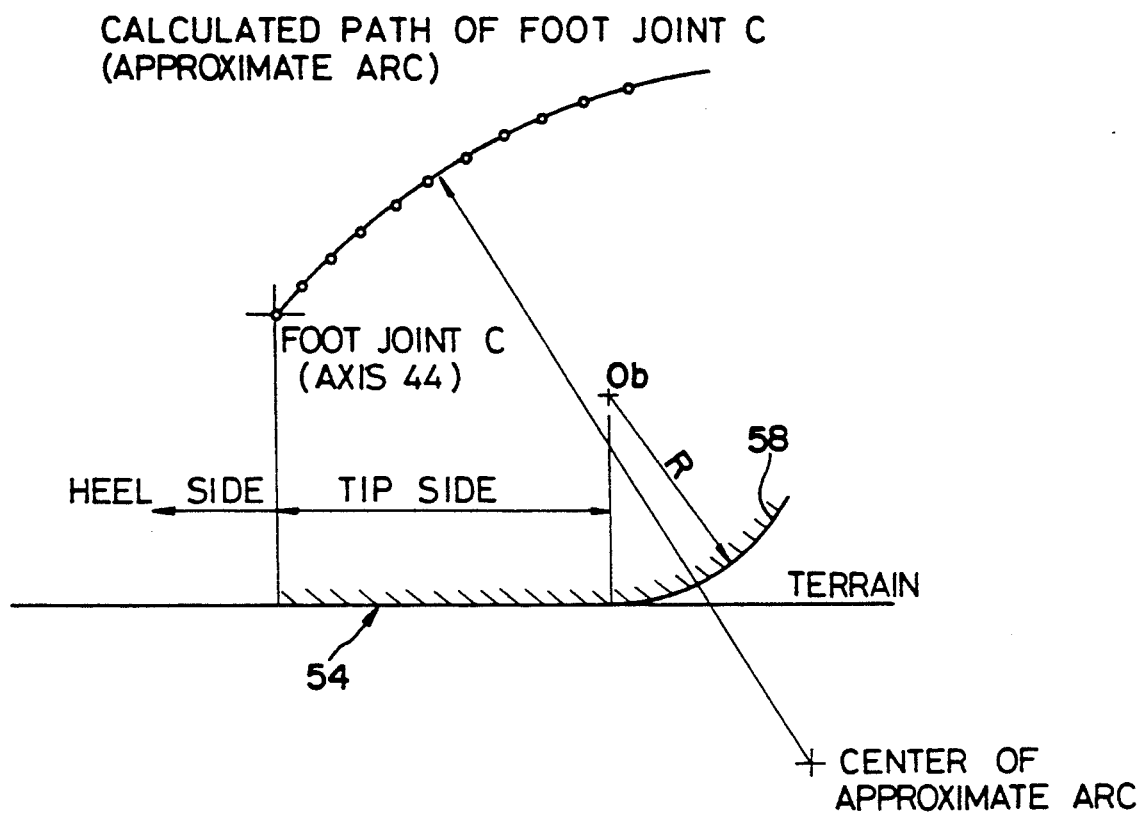
FIG. 4 is a diagram showing the relationship between a path followed by the foot joint of a foot when the legged walking robot walks and the shaped of the foot sole (the tip of the toe) of the foot.
Figure 28:
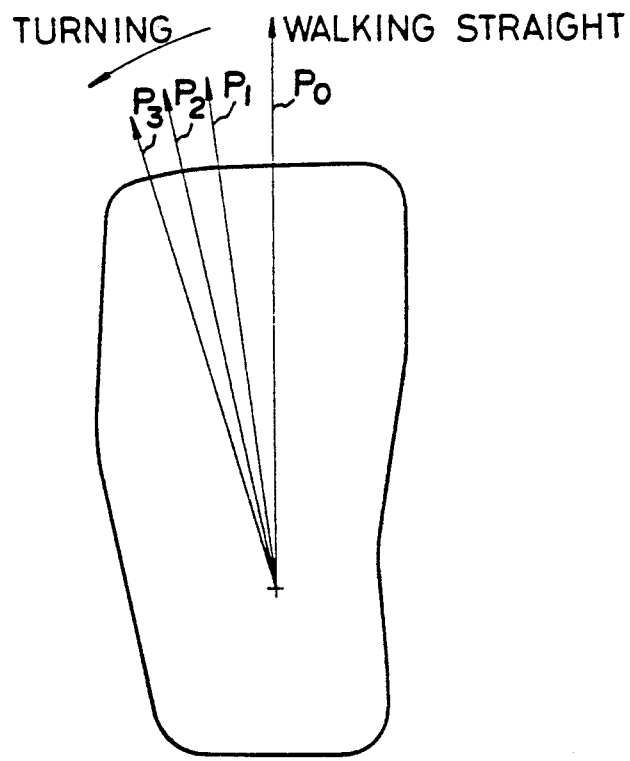
FIG. 28 is a diagram showing the manner in which the center of gravity of the body of a robot moves on a foot sole when the robot turns.

The shape of the foot sole 54 determines the spatial path which is followed by the foot joint. The radius of curvature of the tip 58 is determined such that the path extends arcuately around the point 0 below the terrain surface. The inventors have however found that the foot sole may have a curved surface having a curvature which approximates that of the above path. In the illustrated embodiment, therefore, as shown in FIG. 4, the tip 58 of the foot sole 54 has an arcuate cam surface extending about a point Ob and having a radius R. FIG. 4 also shows a path which is followed by the foot joint 18 (indicated by C and corresponding to an axis 44) when the tip 58 is curved along a single arc. As shown in FIG. 5, the arcuate cam surface of the tip 58 is arranged such that it approaches the foot joint 18 (represented by the location of the six-axis force sensor 50) toward the outer side of the foot (remotely from the inner side that is closer to the other foot), i.e., toward the side corresponding to the side of a human foot where the little toe is located. In FIG. 5, the elastic layer 64 is omitted from illustration, and the curvature of the arcuate cam surface is indicated by contours a. With the curvature of the arcuate cam surface being thus selected, when the foot turns along a curve, as shown in FIG. 28, the center of gravity of the body of the robot moves out of the foot sole along successively varying paths Pn ranging from a region corresponding to the big toe to a region corresponding to the little toe. As a result, the foot can turn smoothly and quickly. Irrespective of the curvature of a turn which the foot is to make, the arcuate cam surface of the tip 58 is shaped such that the path followed by the foot joint extends along an arc about a center below the terrain surface or an arc approximating such an arc, and is smoothly continuous as viewed horizontally. The heel 60 is also curved in the same manner as the tip 58.

Now, the foot of the robot is controlled when the robot walks, as follows: The body 16 houses a source of energy such as a battery for supplying electric energy to the electric motors associated with the legs, and also accommodates a control unit 70 (FIG. 1) comprising a microcomputer for controlling walking movements of the robot. An output signal from the six-axis sensor 50 is transmitted to the control unit 70 over a signal line 72. The electric motors are associated with rotary encoders for detecting angular displacements thereof. Only encoders 74, 76 for detecting the electric motors 24, 26 are shown in FIG. 1 for the sake of brevity. Output signals from the encoders are also transmitted to the control unit 70.

Figure 6:
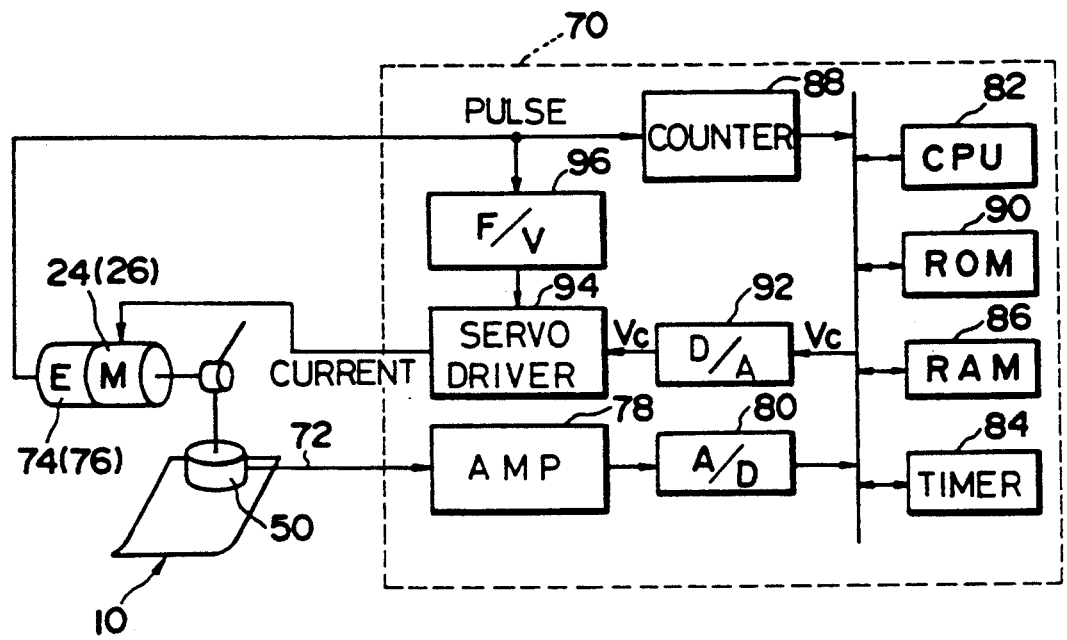
FIG. 6 is a block diagram of a control unit for controlling the foot when the legged walking robot walks.

FIG. 6 shows the control unit 70 in block form. The output signal from the six-axis output sensor 50 is supplied to the microcomputer through an amplifier 78 and an A/D converter 80. A CPU 82 of the microcomputer stores the supplied signal in a RAM 86 at periodic intervals of time depending on the count of a timer 84. Output pulses from the rotary encoders 74, 76 are also stored in the RAM 86 through a counter 88. Depending on the detected parameters, the CPU 82 calculates control values VC for the respective joints based on data stored in a ROM 90. The CPU 82 then transmits the calculated control values through a D/A converter 92 to a servo driver 94, which energizes the electric motors 24, 26. Output signals from the rotary encoders 74, 76 are sent through an F/V converter 96 to the servo driver 94 in a feedback control loop.

Figure 7:
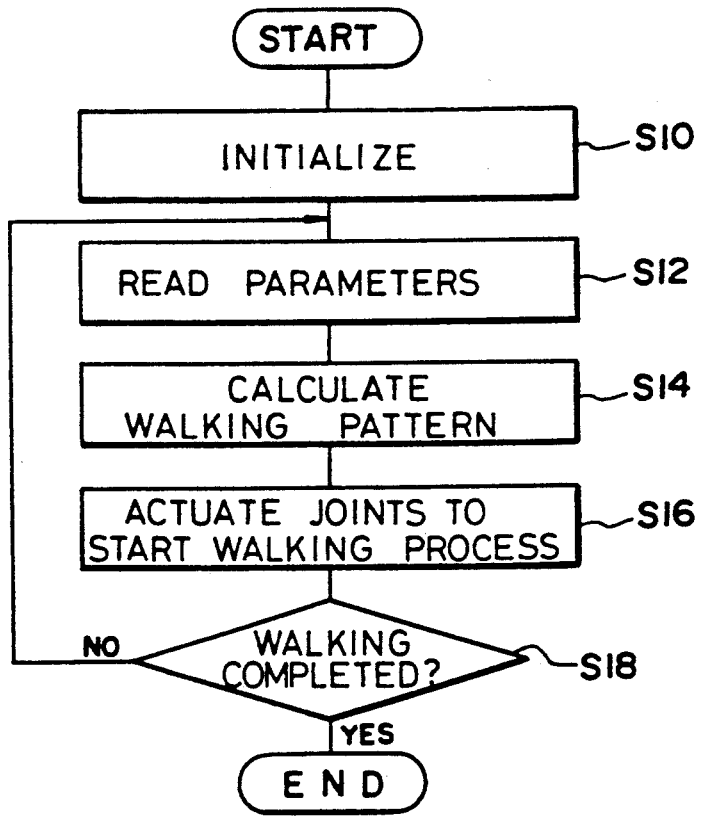
FIG. 7 is a flowchart of a control sequence of the control unit shown in FIG. 6.
Figure 8:
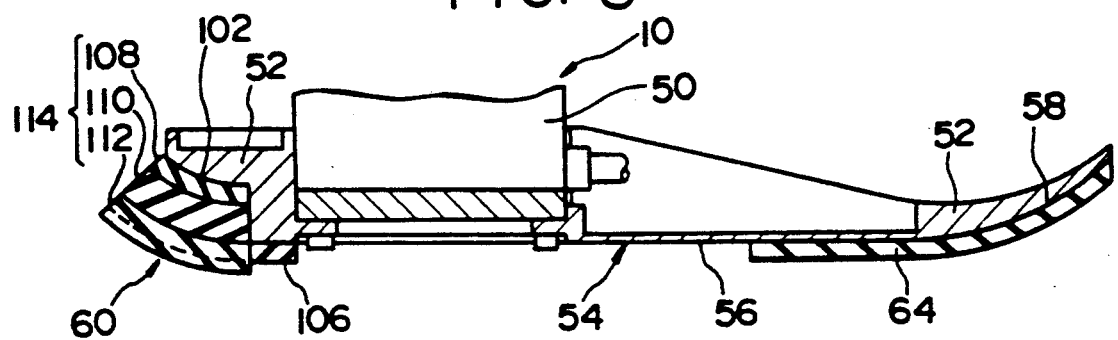
FIG. 8 is a vertical cross-sectional view of a foot of a foot structure according to a second embodiment of the present invention.

FIG. 7 shows a control sequence of the control unit 70. According to the illustrated control sequence, the various parts are initialized at a step S10, and output signals or parameters are supplied from the six-axis force sensor 50 and the encoders 74, 76 in a step S12. Then, a walking pattern or gait is calculated in a step S14. The joints are actuated by the electric motors to get the robot 1 to start walking in a step S16. The steps S12, S14, S16 are repeated until the walking process of the robot is finished in a step S18. While the robot 1 is walking, the entire foot sole 54 including the central area is brought into contact with the terrain or ground, and then the tip 58 kicks the ground to propel the body in the forward direction. Since the curved surface of the tip 58 of the foot sole 54 moves along the terrain surface, the robot 1 walks smoothly without significant changes in the walking speed. When the robot 1 turns, the center of gravity is shifted toward the region corresponding to the little toe while the curved surface of the tip 58 moves along the terrain surface, so that the robot 1 can turn smoothly and quickly.

In the illustrated embodiment, the foot is easy to manufacture and simple in configuration, but can achieve a smooth gait similar to the gait of a human being. The foot also allows the center of gravity of the robot body to be shifted effectively when the robot makes a turn. Since the arcuate cam surface of the tip 58 is covered with the elastic layer 64, the foot sole 54 fits well with surface irregularities of the terrain, thereby maintaining a sufficient surface area for contact with the terrain surface. Therefore, the robot can be stably controlled in posture and direction. When the elastic layers 64, 66 are worn out in long use, the frame 52 is replaced with a new frame with elastic layers. Accordingly, the foot 10 can easily be serviced or does not require complex maintenance.

In the above embodiment, the frame 52 is made of aluminum. However, the frame 52 may be made of any of other rigid and light material such as fiber-reinforced plastics. The elastic layers 64, 66 may not be of a uniform thickness, or may have a suitable pattern of cuts or slots for preventing the foot 10 from slipping. Each of the elastic layers 64, 66 may be in the form of a laminated layer assembly composed of laminated rubber layers of different elastic properties.

Figure 9:
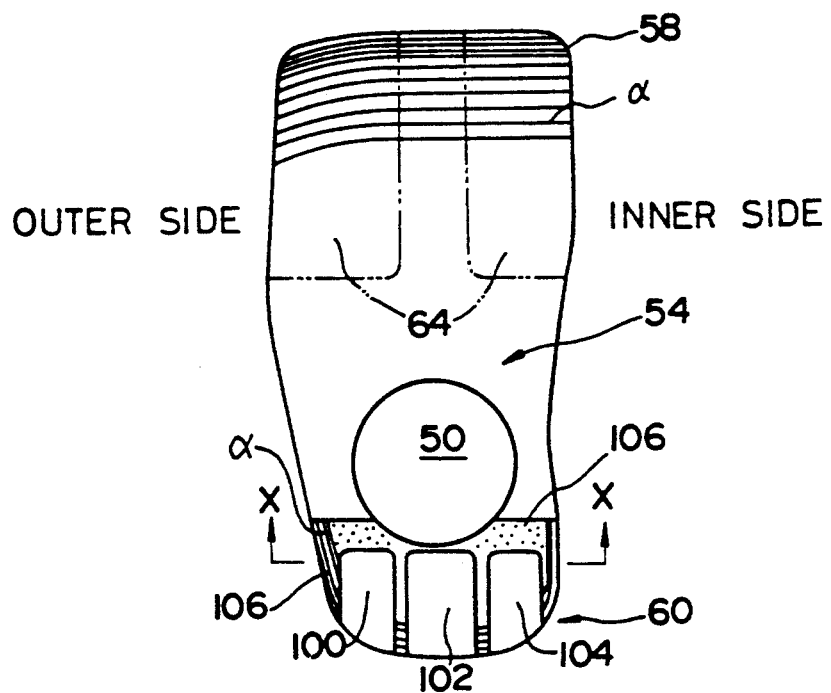
FIG. 9 is a bottom view of the foot shown in FIG. 8.
Figure 10:
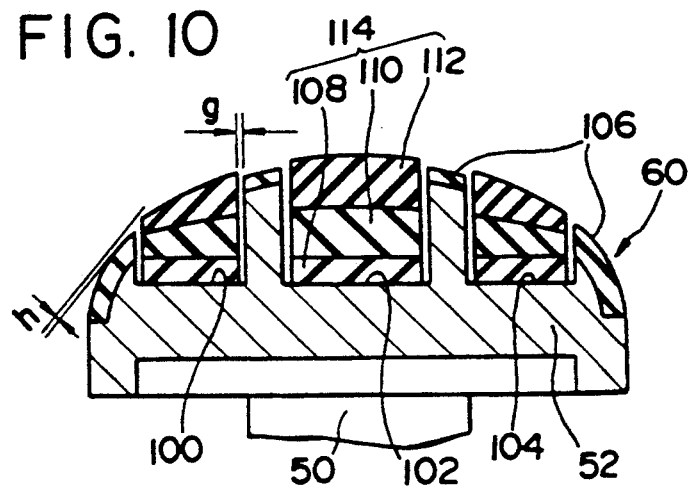
FIG. 10 is an enlarged cross-sectional view taken along line X—X of FIG. 9.
Figure 11:
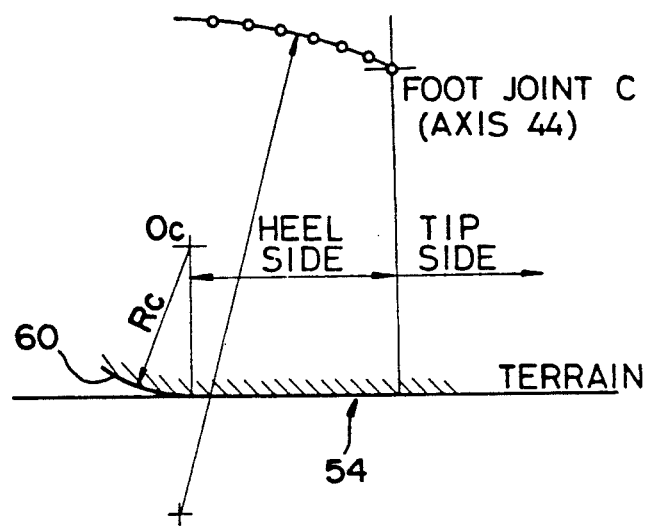
FIG. 11 is a diagram showing the relationship between a path followed by a foot joint and the shape of a heel.
Figure 29:
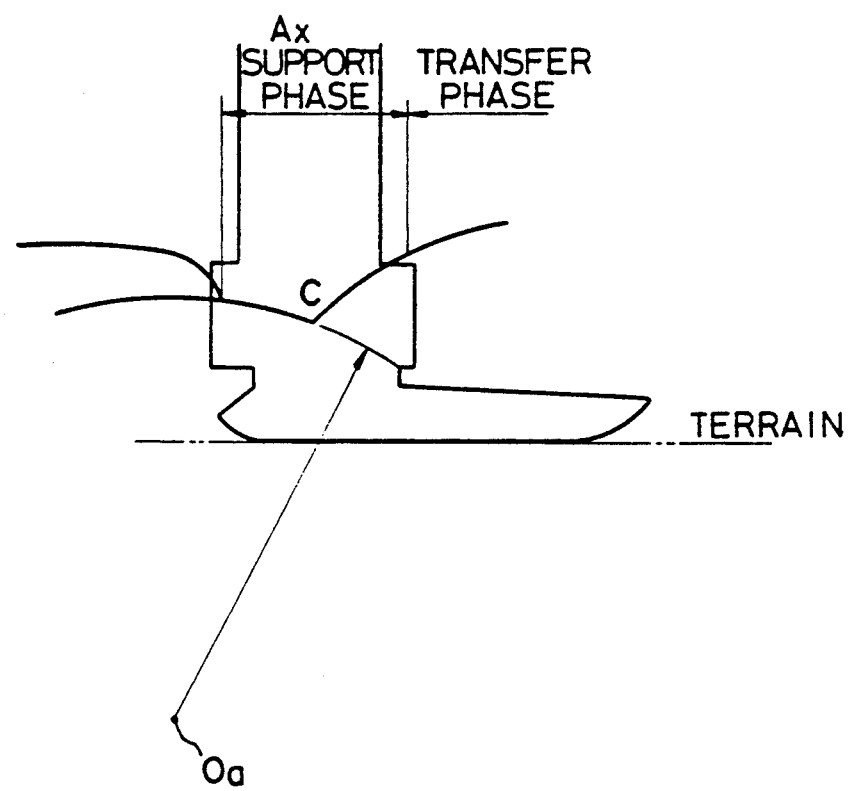
FIG. 29 is a view similar to FIG. 26, showing an ideal spatial path to be followed by a heel before and after the foot lands on and is lifted off the terrain.

FIGS. 8 through 11 show a foot structure according to a second embodiment of the present invention. The second embodiment differs from the first embodiment partly in that the heel 60 of the foot sole 54 has a curved cam surface which enables the foot joint to follow a predetermined spatial path. More specifically, as shown in FIG. 29, the curved cam surface of the heel 60 is selected such that the foot joint C (axis 44) follows a cycloidal curve about an imaginary point Oa below the terrain surface, when the foot lands on the terrain. More specifically, as shown in FIG. 11, the heel 60 has an arcuate curved cam surface having a radius Rc and extending about a point Oc.

Figure 30:
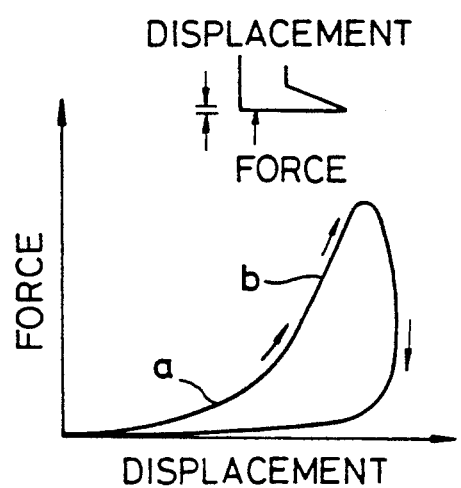
FIG. 30 is a graph showing ideal viscoelastic characteristics of a heel.

As shown in FIG. 9, the heel 60 has a round convex surface continuous in the transverse direction, as indicated by contours a, so that the foot joint C follows the above arcuate curve whichever part of the heel 60 first lands on the ground. The frame 52 has a large recess assembly including recesses 100, 102, 104 spaced in the transverse direction as shown in FIGS. 9 and 10. As better shown in FIG. 10, a first elastic layer 106 is applied to the upper surface of the heel 60, and a laminated layer assembly 114 composed of second, third, and fourth elastic layers 108, 110, 112 is disposed in each of the recesses 100, 102, 104. The elastic layers 106, 108, 110, 112 have different moduli of elasticity. More specifically, in order to dampen shocks or impacts when the foot lands on the terrain and also to transmit necessary forces to the terrain to keep the posture of the robot and to vertically control the center of gravity of the body in coordination with the periodic walking cycles, the heel 60 should preferably be given viscoelastic characteristics which, as shown in FIG. 30, have a first stage a in which the heel 60 is elastically deformed to a large degree under a relatively small force, and a second stage b in which the elastic deformation of the heel 60 does not increase substantially under a subsequently applied larger force. To meet such desired viscoelastic characteristics, the first elastic layer 106 is made of a material such as rubber of the like which has a relatively low degree of elasticity and is elastically deformable to a relatively small degree under load, i.e., has the viscoelastic property indicated at b in FIG. 30. The laminated layer assemblies 114 are made of a material such as rubber of the like which is elastically deformable substantially linearly under load, i.e., has the viscoelastic property indicated at a in FIG. 30. The laminated layer assemblies 114 are accommodated in the respective recesses 100, 102, 104 with gaps g between themselves and wall surfaces of the recesses, the gaps g allowing the laminated layer assemblies 114 to expand laterally under the applied load. The outer surfaces of the laminated layer assemblies 114 are higher than the outer surface of the first elastic layer 106 by a dimension h, as shown in FIG. 10.

With the foot structure according to the second embodiment, the curved cam surface of the heel 60 allows the foot to land on the terrain efficiently and smoothly. The tip 58 of the foot sole 54 also has the same curved cam surface as with the first embodiment. As a consequence, in both support and transfer phases of the leg, the entire foot sole allows the robot to walk smoothly with high energy conversion efficiency, in a manner similar to the gait of human beings. The foot sole permits the foot to land smoothly on the ground when the robot turns with the center of gravity of the body being positioned outside or inside of the turning curve, so that a desired gait can be given to the robot when it is controlled to walk. When the robot turns, the foot may be directed outwardly or inwardly with respect to the turning curve. Thus, the angle at which the foot is actuated can freely be determined.

When the foot lands on the terrain, the laminated layer assemblies 114 which project from the recesses 100, 102, 104 first contact the ground and starts to be elastically deformed, thereby dampening shocks or impacts. Thereafter, the first elastic layer 106 of relatively low elasticity contacts the ground, producing reactive forces tending to maintain the posture of the robot, so that the robot posture can be desirably maintained and the center of gravity of the robot can be vertically shifted accurately. The laminated layer assemblies 114 are made of softer rubber which is elastically deformable to a larger degree. Consequently, internal stresses of the laminated layer assemblies 114 are large and the durability thereof per se is low. However, inasmuch as the harder first elastic layer 106 is brought into contact with the ground after the laminated layer assemblies 114 have contacted the ground, the laminated layer assemblies 114 are prevented from being excessively deformed. As a result, the laminated layer assemblies 114 are not worn out too rapidly.

In the second embodiment, the heel 60 is associated with the first elastic layer 106 and the laminated layer assemblies 114. However, the heel 60 may be combined with any of various other elastic layer constructions insofar as they have the two-stage characteristics shown in FIG. 30.

Figure 12:
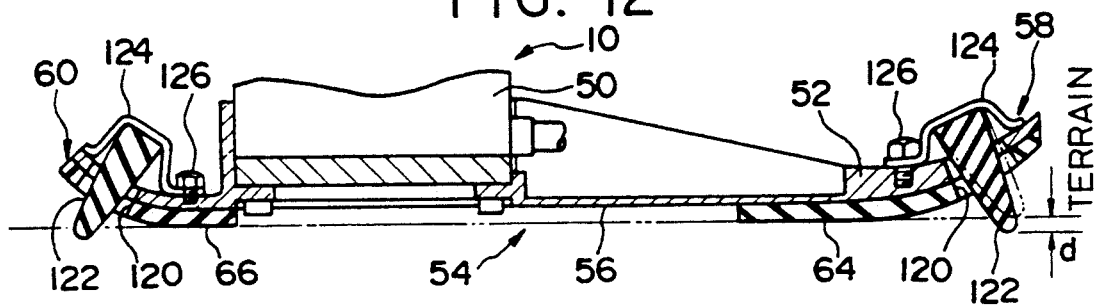
FIG. 12 is a vertical cross-sectional view of a foot of a foot structure according to a third embodiment of the present invention.
Figure 13:
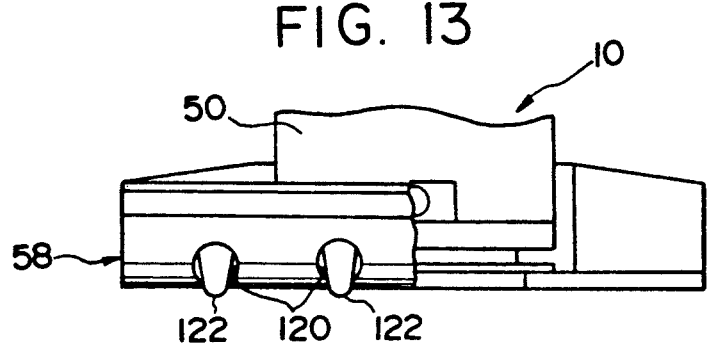
FIG. 13 is a front elevational view, partly broken away, of the foot shown in FIG. 12.
Figure 14:
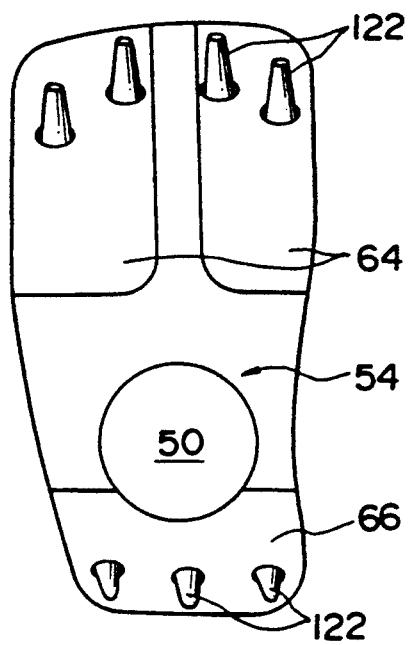
FIG. 14 is a bottom view of the foot sole of the foot shown in FIG. 12.

FIGS. 12 through 14 illustrate a foot structure according to a third embodiment of the present invention. According to the present invention, the foot has means for compensating for a reduction in the static stability which is caused by the curved cam surfaces of the foot sole. More specifically, the frame 52 has openings or windows 120 defined in the tip 58 and the heel 60 at their curved cam surfaces, and projections 122 extending downwardly respectively through the windows 120. Each of the projections 122 is made of an elastic material such as rubber or the like, and has a downwardly pointed conical shape. The upper larger-diameter end of each projection 122 is fixed to a plate 124 of aluminum or the like by adhesive bonding or the like.

Each plate 124 has one end secured to the frame 52 by bolts 126, the other end being a free end. The projections 122 have a length such that they project downwardly beyond the horizontal plane of the foot sole 54 by a distance d in their free state. If the length of the projections 122 is suitably selected, when the leg is in an upright position, the projections 122 are elastically flexed against the terrain surface, causing the cantilevered plates 124 to apply a preload to the foot 10. The projections 122 on the tip 58 are arrayed transversely of the curved cam surface. As shown in FIG. 14, it is preferable that those projections 122 near the center be positioned closely to the front end of the tip S8, and the other projections 122 near the regions corresponding to the little and big toes be retracted toward the foot joint 18. The projections 122 on the heel 60 are also arrayed transversely of the curved cam surface. The central projection 122 is positioned closely to the rear end of the heel 60. The projections 122 on the heel 60 and the projections 122 on the tip 58 are held out of alignment with each other in the longitudinal direction of the foot 10. With such an arrangement of the projections 122, when the foot 10 lands on or is lifted off the terrain, the projections 122 are successively brought into and out of contact with the terrain surface, and hence the pressure applied to the foot sole 54 through the projections 122 by the projections 122 is evenly distributed. Therefore, the force can smoothly be transmitted from the terrain to the foot 10 and vice versa.

While the robot is walking, the projections 122 are elastically flexed to allow the curved cam surfaces to contact the terrain surface, and also to permit the foot sole 54 to fit well with surface irregularities of the terrain. Since the projections 122 are preloaded and pressed against the ground while the foot is at rest, the robot is highly stabilized while at rest. The projections 122 which are positioned out of alignment on the foot sole 54 transmit the pressure from the terrain to the foot 10 evenly, i.e., through successively varying points at the tip 58 and the heel 60 of the foot sole 54 when the foot lands on and is lifted off the terrain, so that the force is smoothly transmitted from the terrain to the foot.

In the above embodiment, the projections 122 are provided on both the tip 58 and the heel 60, the projections 122 may be positioned on only the tip 58 or the heel 60.

Figure 15:
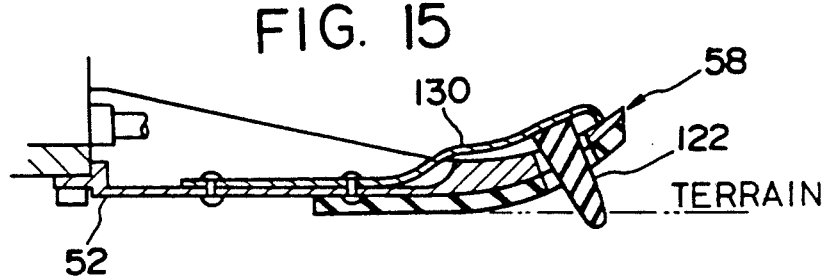
FIG. 15 is a vertical cross-sectional view of a foot of a foot structure according to a fourth embodiment of the present invention.

Robot stability can also be achieved by a foot structure according to a fourth embodiment of the present invention as shown in FIG. 15. The foot structure shown in FIG. 15 differs from the foot structure shown in FIG. 12 only in that the projections 122 of rubber or the like are bonded to a metallic leaf spring 130 fixed to the frame 52.

Figure 16:
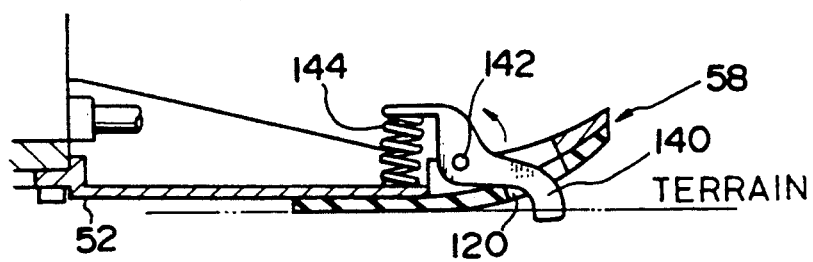
FIG. 16 is a vertical cross-sectional view of a foot of a foot structure according to a fifth embodiment of the present invention.

FIG. 16 shows a foot structure according to a fifth embodiment of the present invention. In the fifth embodiment, each projection is made of a rigid material, and a spring is used to urge the projection. A bell crank 140 made of a rigid material such as hard resin is angularly movably supported on the frame 52 by a pivot shaft 142. One end of the bell crank 140 projects downwardly through each of the windows 120, and the other end thereof is supported on and urged upwardly by a metallic coil spring 144 mounted on the frame 52 for biasing the downwardly projecting end of the bell crank 140 in a downward direction. The other details of the foot structure shown in FIG. 16 are the same as those of the foot structures shown in FIGS. 12 and 15.

Figure 17:
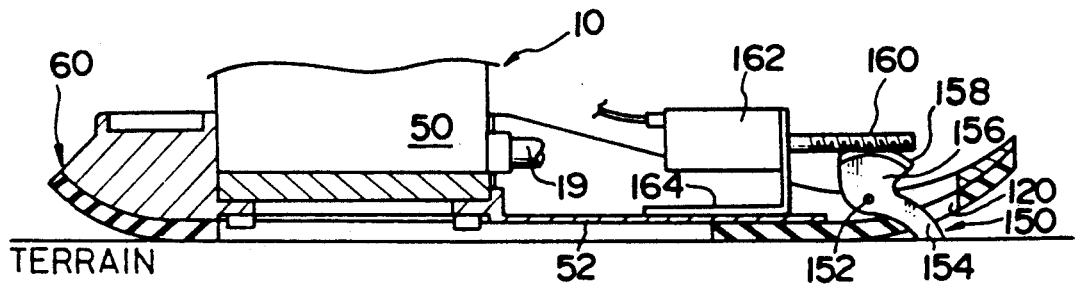
FIG. 17 is a vertical cross-sectional view of a foot of a foot structure according to a sixth embodiment of the present invention.
Figure 18:
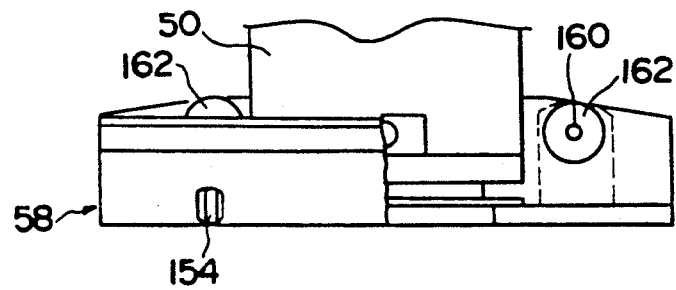
FIG. 18 is a front elevational view, partly broken away, of the foot shown in FIG. 17.
Figure 19:
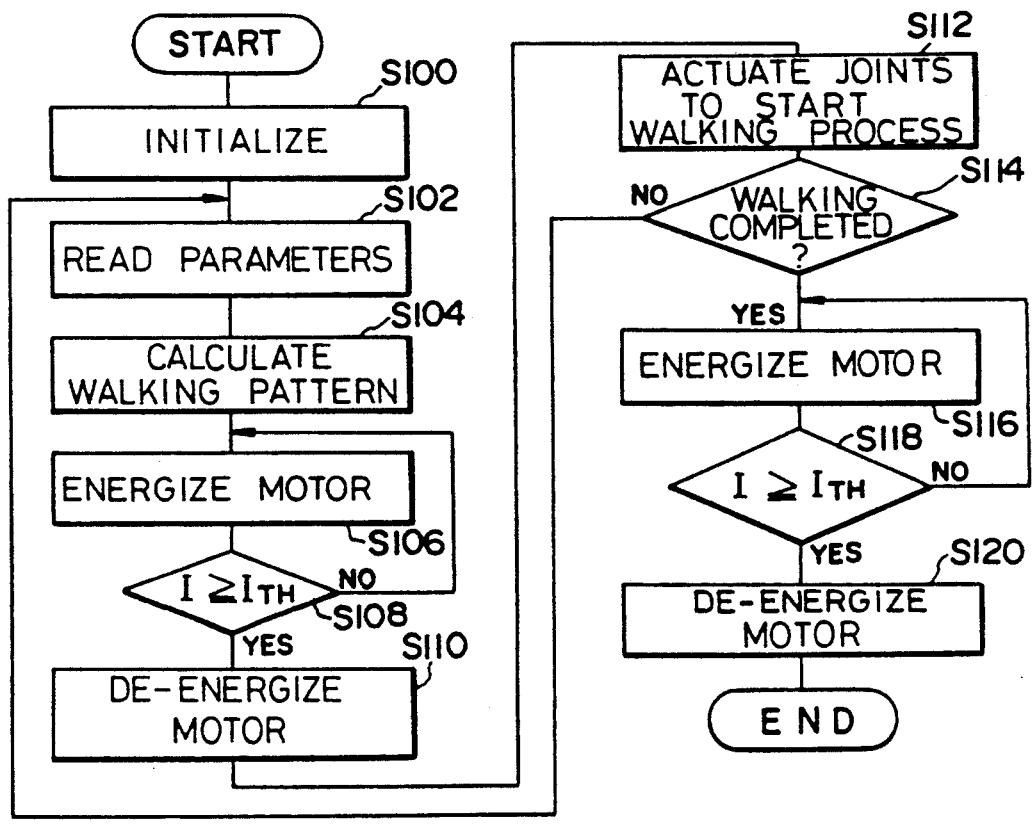
FIG. 19 is a flowchart of an operation sequence of the foot shown in FIG. 17.

FIGS. 17 through 19 illustrate a foot structure according to a sixth embodiment of the present invention. The foot structure shown in FIGS. 17 through 19 is constructed to compensate for a reduction in the static stability and to save energy. As shown in FIG. 17, a bell crank 150 made of a rigid material such as a hard resin is angularly movably supported on the frame 52 by a pivot shaft 152. One end of the bell crank 150 serves as a projection 154 projecting downwardly through each window 120, as shown in FIG. 18. The distal lower end of the projection 154 projects downwardly beyond the horizontal plane of the foot sole 54 in its free state, so that when the lower end of the projection 154 is placed in a recess in the terrain surface, the projection 154 contacts the terrain. The other end of the bell crank 150 is shaped into a larger-width sectorial member 156 which has a worm wheel 158 on its edge. The worm wheel 158 is held in mesh with a cylindrical worm 160 that is coaxially joined to the output shaft of an electric motor 162 adjacent thereto. The electric motor 162 is mounted on a support 164 of L-shaped cross section attached to the frame 52, and is positioned such that the cylindrical worm 160 is in mesh with the worm wheel 158. Rotation from the electric motor 162 is converted into swinging movement of the bell crank 150 by the cylindrical worm 160 and the worm wheel 158, thereby moving the projection 154 downwardly from the window 120 and upwardly into the window 120. The speed reduction ratio provided by the cylindrical worm 160 and the worm wheel 158 is selected such that the swinging movement from the bell crank 150 will not be transmitted to the electric motor 162, and hence the cylindrical worm 160 will not be rotated by the worm wheel 158. The other details of the foot structure shown in FIG. 17 are the same as those of the foot structure according to the first embodiment.

Operation of the foot structure shown in FIGS. 17 and 18 will be described below with reference to FIG. 19. The projection 154 can be moved downwardly from the window 120 or upwardly into the window 120 by the electric motor 162. More specifically, when the robot is at rest, the electric motor 162 is energized to rotate its output shaft in one direction to move the projection 154 downwardly from the curved cam surface of the tip 58, as shown in FIG. 17. When the robot is walking, the electric motor 162 is reversed to rotate its output shaft in the opposite direction to move the projection 154 upwardly into the curved cam surface. More specifically, as shown in FIG. 19, the parts of the legs are initialized in a step S100, and the detected parameters are read in a step S102, after which a walking pattern is calculated in a step S104. Then, the electric motor 162 is energized to make the foot ready for walking. A step S108 determines whether an electric current supplied to the electric motor 162 has exceeded a predetermined value $I_{TH}$ or not. If the supplied current has exceeded the value $I_{TH}$, then the electric motor 162 is de-energized in a step S110. Specifically, when the projection 154 of the bell crank 150 is fully retracted back into the window 120, the cylindrical worm 160 is stopped, and the torque applied to the electric motor 162 exceeds a predetermined value. The applied torque is detected through the electric current supplied to the electric motor 162, thus detecting the time when the retraction of the projection 154 is completed. The electric current can be detected by a suitable detector incorporated in a motor driver for the electric motor 162.

Then, the joints of the legs are actuated to start a walking process in a step S112, until the walking process is completed in a step S114. When the completion of the walking process is detected in the step S114, the electric motor 162 is reversed in a step S116. A step 118 then determines whether the projection 154 has fully projected downwardly When the projection 154 has fully projected downwardly, the electric motor 162 is de-energized. At this time, the flat central area of the foot sole is held against the terrain, and the projection 154 of the bell crank 150 is also held in contact with the terrain. Since the foot 10 has a large area for contact with the terrain, the robot is stably supported on the ground. The flat central area of the foot sole does not contribute greatly to the stability of the robot, but the projection 154 projecting downwardly in contact with the terrain is highly effective to support the foot stably. Accordingly, the bell crank 150 makes the robot highly stable even when the terrain on which the robot is held at rest has surface irregularities.

While the robot is walking, the bell crank 150 is retracted out of contact with the terrain. When the robot is held at rest, the bell crank 150 projects from the foot sole into contact with the terrain to support the foot even if the terrain has surface irregularities. Therefore, the robot can stably be maintained in an upright position even when the terrain is a rough terrain. When the robot is at rest, the electric motor 162 is de-energized to keep the projection 154 in the projecting position due to the locking engagement between the worm wheel 158 and the cylindrical worm 160. Therefore, the foot structure shown in FIGS. 17 through 19 is also an energy saver.

Figure 20:
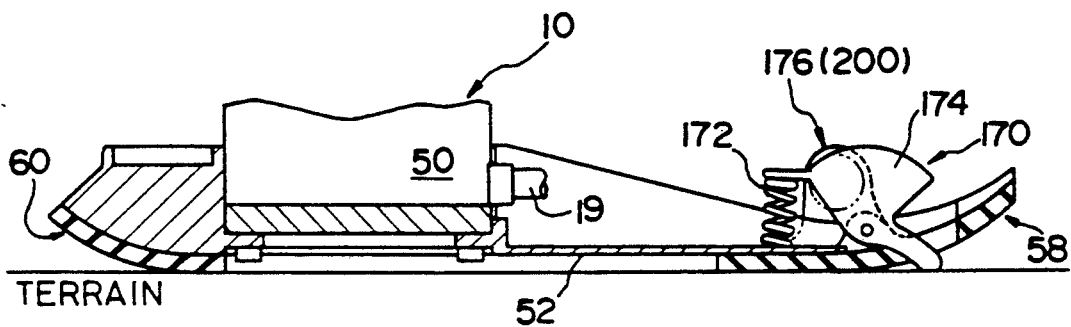
FIG. 20 is a vertical cross-sectional view of a foot of a foot structure according to a seventh embodiment of the present invention.
Figure 21:
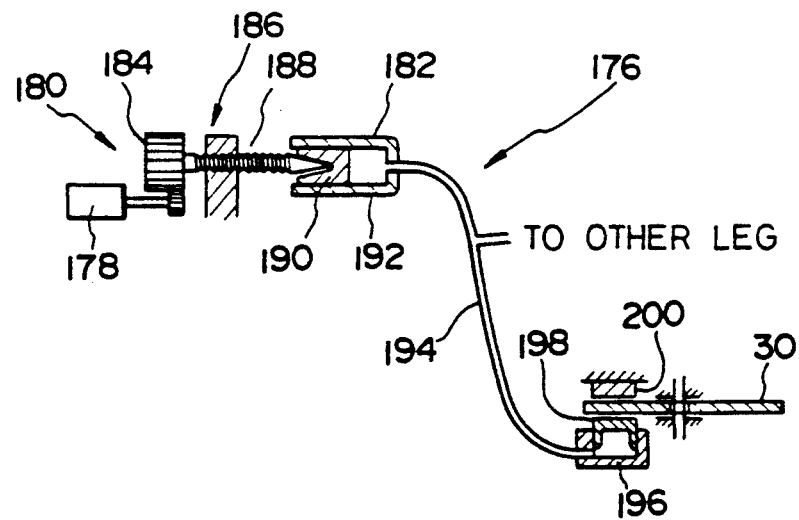
FIG. 21 is a cross-sectional view of a brake mechanism in the foot shown in FIG. 20.

FIGS. 20 and 21 show a foot structure according to a seventh embodiment of the present invention. The foot structure in this embodiment is also aimed at the saving of energy and the compensation for a reduction in static stability. In the sixth embodiment, the bell crank is required to move a considerable stroke and is actuated by the electric motor. If the electric motor is small in size, then the speed reduction ratio of the worm gear mechanism has to be large, requiring a long time to operate the bell crank. When the robot falls under external forces, the motor is subjected to a large load. Therefore, the motor and the worm bear mechanism have to be of a rugged structure. At least one electric motor is necessary for each leg. The foot structure according to the seventh embodiment is designed to eliminate the above drawbacks of the sixth embodiment.

As shown in FIG. 20, a bell crank 170 angularly movably mounted on the frame 52 is normally urged by a coil spring 172 to project downwardly. When the robot is walking, the bell crank 170 is retracted upwardly in response to movement of the curved cam surface of the tip 58 along the terrain. The bell crank 170 has a larger-width sectorial member 174 on its upper end, which is sandwiched by a brake mechanism 176 for locking the bell crank 170 in its projecting position.

The brake mechanism 176 will be described below with reference to FIG. 21 An electric motor 178 is housed in the body of the robot, and operatively coupled to a hydraulic master cylinder mechanism 182 through a speed reducer 180. Rotation from the electric motor 178 is transmitted through a speed reducer gear 184 of the speed reducer 180 to a screw transmission mechanism 186. The screw transmission mechanism 186 has an axially movable screw 188 coupled coaxially to the speed reducer gear 184 and having an end joined to a piston 190 of the hydraulic master cylinder mechanism 182. When the electric motor 187 is energized to rotate its output shaft in one direction, the piston 190 is axially moved in a cylinder 192 of the hydraulic master cylinder mechanism 182 to discharge working oil from the cylinder 192. The discharged working oil is delivered under pressure through a pipe 194 in the robot body. The pipe 194 is branched into pipe members which extend through the thighs and shanks of the legs into the respective feet where the pipe members are coupled to slave cylinders 196 (only one shown in FIG. 21). A brake pad 198 is slidably disposed in the slave cylinder 196 in confronting relation to one surface of the sectorial member 174 of the bell crank 170. Another brake pad 200 is fixed in confronting relation to the opposite surface of the sectorial member 174. When the working oil is supplied to the slave cylinder 196, the brake pad 198 is pressed against the sectorial member 174, forcing the sectorial member 174 against the other brake pad 198. Therefore, the sectorial member 174 is clamped and braked by these brake pads 198, 200.

The foot structure shown in FIGS. 20 and 21 operates in substantially the same manner as the foot structure according to the sixth embodiment. However, if the walking process of the robot is completed in the step S114, then the electric motor 178 is energized to hold the bell crank 170 in the projecting position.

According to the seventh embodiment, the electric motor may be smaller in size than that of the electric motor in the sixth embodiment because the electric motor does not angular move the bell crank. In the case where a plurality of bell cranks are provided on each foot, the number of pipes and slave cylinders has to be increased, but only the single electric motor suffices for operating the master cylinder. The other details and advantages of the seventh embodiment are the same as those of the sixth embodiment. Brake forces applied to the bell crank 174 are determined depending on the pressure produced by the slave cylinder 196 and the coefficients of friction of the surfaces of the brake pads 198, 200 and the sectorial member 174. Suitable frictional elements may be applied to the sectorial members 174 of the bell crank 170 for increased frictional forces. The brake mechanism 176 may be operated under pneumatic pressure rather than hydraulic pressure.

FIGS. 22 through 25 illustrate a foot structure according to an eighth embodiment of the present invention. The eighth embodiment resides in that contact sensors are disposed on the foot sole for recognizing the profile of an object which is brought into contact with the foot sole.

Figure 22:
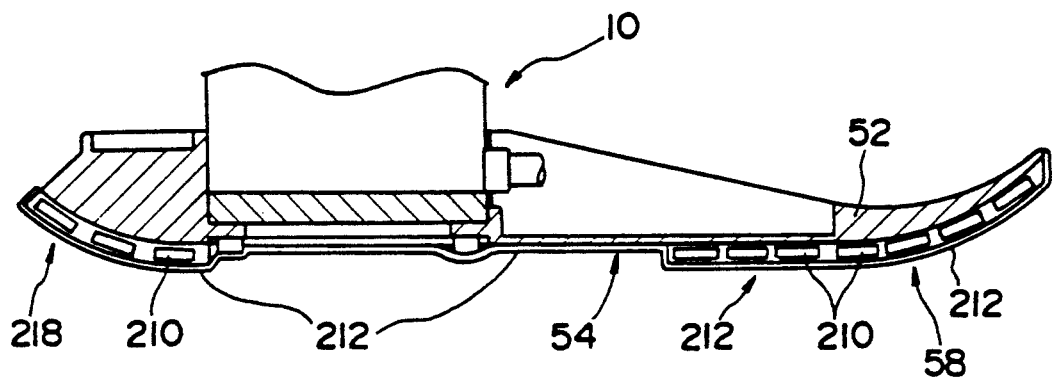
FIG. 22 is a vertical cross-sectional view of a foot of a foot structure according to an eighth embodiment of the present invention.

As shown in FIG. 22, a planar array or matrix of contact sensors 210 are mounted on each of a front portion of the lower surface of the frame 52, including the tip 58, and the lower surface of the heel 60. The contact sensors 210 are covered with a relatively thin protective layer 212 of rubber.

Figure 23:
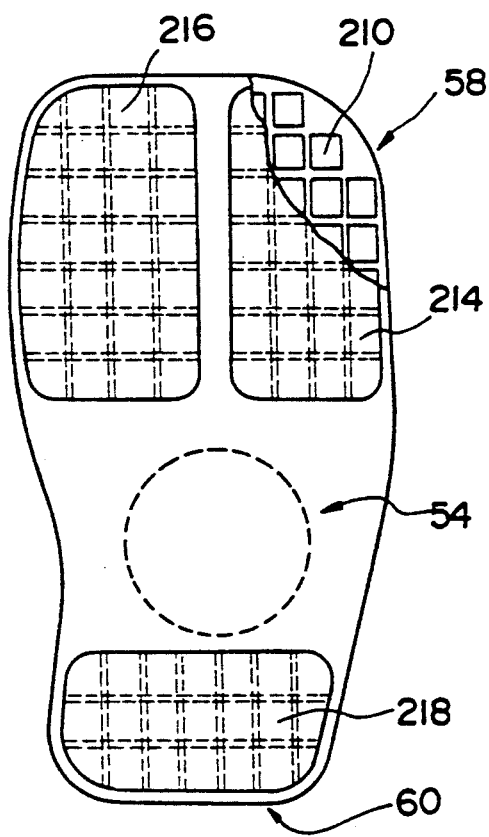
FIG. 23 is a bottom view of the foot sole of the foot shown in FIG. 22.

More specifically, as shown in FIG. 23, there are two groups of contact sensors 210 located on laterally spaced regions of the front portion of the lower surface of the frame 52 or foot sole 54, and one group of contact sensors 210 located on the heel 60. These groups of contact sensors 210 serve as respective lands 214, 216, 218 on the foot sole 54. The other portions of the foot sole 54 than the lands 214, 216, 218 are in the form of recesses which serve as drain grooves for discharging water from the foot sole 54 when the robot walks on a wet floor or terrain, so that the foot 10 provides increased gripping forces with respect to the floor or terrain.

Figure 24:
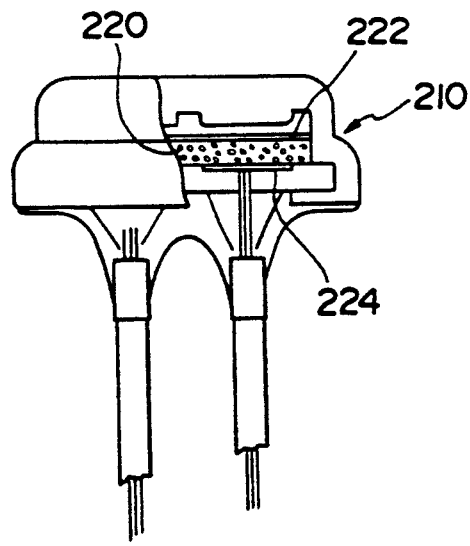
FIG. 24 is a cross-sectional view of a contact sensor incorporated in the foot sole shown in FIG. 23.

FIG. 24 shows in cross section one of the contact sensors 210 which are identical in construction to each other. The contact sensor 210 has two electrodes 222, 224 disposed in confronting relation to each other, with an electrically conductive rubber member 220 sandwiched therebetween. When a vertical load is applied to the electrically conductive rubber member 220, the rubber member 220 is compressed thereby varying its electric resistance. The applied load can be detected when the change in the electric resistance of the rubber member 220 is measured. The contact sensors 210 of the above structure are known per se. These contact sensors 210 are arranged in a matrix, as described above.

Figure 25:
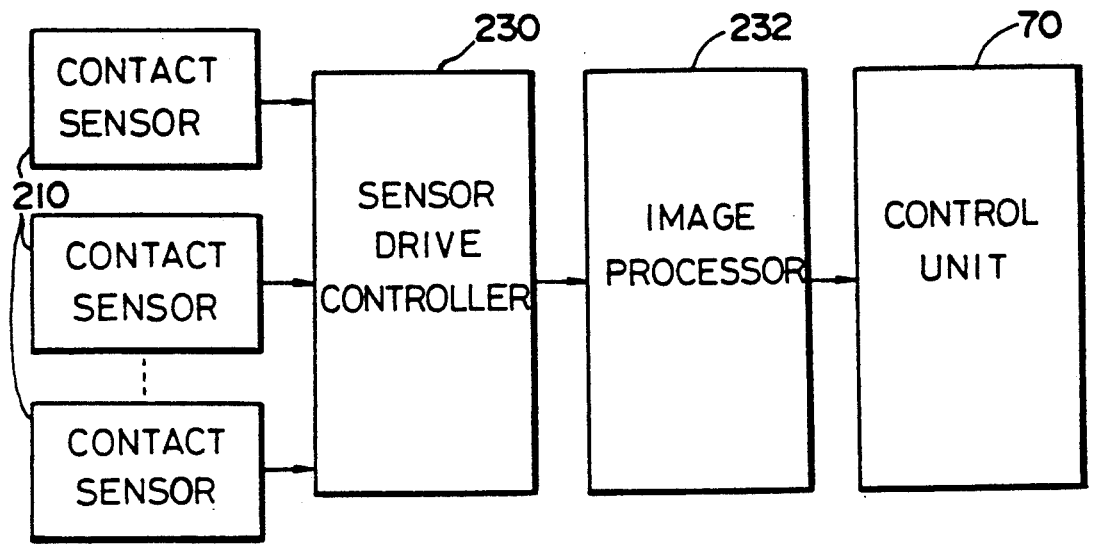
FIG. 25 is a block diagram showing the manner in which signals from the contact sensors are processed.

FIG. 25 shows the manner in which output signals from the contact sensors 210 are processed. The analog output signals from the contact sensors 210 are supplied to a sensor drive controller 230 which scans the output signals in vertical and horizontal directions and compares them with multi-valued threshold values. The sensor drive controller 230 then produces output signals indicative of the result of comparison and representing the outer profile or hardness of an object stepped upon by the foot sole, and delivers the produced output signals as video signals.

The video signals are then supplied to an image processor 232 in which the video signals are pre-processed for feature extraction and other video processing operation. The processed video signals are then compared with data from an image data base, thereby detecting the outer profile or position of the object on the foot sole. The image processor 232 then applies its output signal to the control unit 70. In the control unit 70, the CPU can determine the outer profile of the object and the position thereof on the foot sole, and can vary the gait for walking as desired in the walking control process shown in FIG. 7 based on the profile or position data supplied to the control unit 70.

Even when the foot sole is held in contact with a flat ground or terrain, since the output signals from the contact sensors 210 are compared with threshold value, the pixels corresponding to the contact sensors 210 vary in brightness level depending on the pressure applied to the contact sensors 210, and hence the weight distribution over the foot sole can be determined. If necessary, one of the legs may be actuated to correct the posture of the robot based on the detected weight distribution.

Since it is possible to recognize the shape of an object stepped upon by the foot sole and the position of the object with respect to the foot sole, the robot can be controlled to walk stably even over a rough terrain. Each of the contact sensors 210 is mainly composed of the electrically conductive rubber member 220. Inasmuch as the contact sensors 210 are elastically flexible themselves, the protective layer 212 may be of a minimum thickness for protecting the contact sensors 210 from foreign matter such as dust, dirt, water droplets, or the like. Mechanical shocks or impacts can be absorbed or dampened by the contact sensors 210 themselves. Consequently, the contact sensors 210 can well be protected without an substantial reduction in their sensitivity. Any increase in the weight of the foot is minimized because the contact sensors 210 are relatively light. As the contact members 210 are elastically flexible per se, shocks or impacts applied to the foot at the time it lands on the terrain are also dampened, and the foot sole is allowed to fit well with the terrain.

In the above embodiment, the output signals from the contact sensors 210 are compared with the multi-valued threshold values. However, the output signals from the contact members 210 may be compared with a binary threshold value to produce ON or OFF output signals, which provide binary two-dimensional information that is effective to detect only the outer profile of the object contacted by the foot sole.

In all of the above embodiments, the foot structure is incorporated in a two-legged walking robot. However, the principles of the present invention are also applicable to legged walking robots with three or more legs, which have gaits similar to that of the two-legged walking robot.

Although certain preferred embodiments have been shown and described, it should be understood that many changes and modifications may be made therein without departing from the scope of the appended claims.

What is claimed is:

1. A foot structure for a legged walking robot having a foot pivotally linked to a shank member about an axis a foot joint, comprising:
    a substantially circularly curved toe section disposed on a sole portion of said foot, said curved toe section having a radius of curvature centered about a point located above said toe section and below said axis of the foot joint, said curved toe section having a convex shape along said sole portion such that the foot follows a predetermined curved path along a forward walking direction; and
    a substantially flat section disposed centrally on said sole portion adjoining and tangent to the toe section.

2. The foot structure of claim 1 further comprising a substantially circularly curved heel section having a radius of curvature centered about a point located above said heel section and below said axis of the foot joint, the heel section adjoining and tangent to said flat section.

3. The foot structure of claim 1 further comprising an elastomeric layer on the toe section and heel section.

4. The foot structure of claim 2 further comprising;
    an elastomeric layer on the toe section;
    a plurality of recesses in the heel section;
    an elastomeric layer on the heel section around the recesses;
    a laminated elastomeric assembly substantially centrally positioned within each recess in the heel section, with a gap separating each laminated elastomeric assembly on opposite lateral sides from the recess which the laminated assembly is positioned within, each laminated assembly having an outermost layer protruding beyond the elastomeric layer on the heel section.

5. The foot structure of claim 4 wherein the plurality of laminated elastomeric assemblies comprise a multiplicity of elastic layers with each of the elastic layers having a different modulus of elasticity.

6. The foot structure of claim 4 wherein the elastomeric layer on the heel section has a higher modulus of elasticity than the plurality of laminated elastomeric assemblies.

7. The foot structure of claim 4 wherein the foot has an inner side and an outer side and the heel section is convexly curved in a transverse direction extending perpendicularly from the inner side to the outer side.

8. The foot structure of claim 2 wherein the foot has an inner side and an outer side and the heel section is convexly curved in a traverse direction extending perpendicularly from the inner side to the outer side.

9. The foot structure of claim 2 further comprising:
a window opening extending through the toe section or the heel section;
a rigid projection mounted on the foot and pivotable through the window opening; and
biasing means for biasing the projection to pivot through the window opening into a ground contact position.

10. The foot structure of claim 9 wherein the robot has a weight sufficient to force the projection into the foot, against a force exerted by the biasing means, as the robot walks.

11. The foot structure of claim 9 further comprising:
locking means for locking the projection against movement; and
an actuator for actuating the locking means.

12. The foot structure of claim 2 further comprising:
a window opening extending through the toe section or the heel section;
a rigid projection mounted on the foot and pivotable through the window opening;
drive means engaged to the projection; and
an actuator linked to the drive means, the actuator energizable to pivot the projection through the window opening, via the drive means, into and out of a projecting position.

13. The foot structure of claim 2 further comprising at least one elastic material projection retractably extending from the heel section at an acute angle to the central section.

14. A foot structure for a legged walking robot having a foot, pivotally linked to a shank member about an axis of a foot joint, comprising:
a substantially circularly curved toe section disposed on a sole portion of said foot, said curved toe section having a radius of curvature centered about a point located above said toe section and below said axis of the foot joint, said curved toe section having a convex shape along said sole portion such that the foot follows a predetermined curved path along a forward walking direction;
a substantially flat section disposed centrally on said sole portion adjoining and tangent to the toe section; and
at least one elastic material projection retractably extending from said toe section at an acute angle to said flat section.

15. The foot structure of claim 14 further comprising biasing means attached to the foot and supporting the projection.

16. The foot structure of claim 14 further comprising a plurality of projections extending from the toe section and the heel section with the projections not aligned in the traverse direction or in a front-back direction perpendicular to the traverse direction.

17. A foot structure for a legged walking robot having a foot comprising:
a circularly curved toe section shaped such that the foot follows a predetermined curved path along a forward walking direction;
a substantially flat central section adjoining the toe section;
a circularly curved heel section adjoining the central section;
at least one rigid projection pivotable through a window in one of the curved toe and heel sections into and out of a projecting position in response to an increase in a load applied to the foot;
biasing means for normally biasing the projection into the projecting position, said projection retractable out of the projecting position while compressing the biasing means in response to the load applied to the foot;
a brake for holding the projection in the projecting position;
an actuator for applying braking power to the brake; and
power transmitting means for transmitting braking power from the actuator to the brake, including means for preventing the actuator from being actuated by the brake, the projection being lockable in the projecting position in response to de-energization of the actuator.

* * * * *